(12) United States Patent
Lee et al.

(10) Patent No.: US 9,547,781 B2
(45) Date of Patent: Jan. 17, 2017

(54) METHOD FOR RECOGNIZING TAG IN ENVIRONMENT USING SAME FREQUENCY BAND AND NFC DEVICE FOR THE SAME

(71) Applicant: RESEARCH & BUSINESS FOUNDATION SUNGKYUNKWAN UNIVERSITY, Suwon-si (KR)

(72) Inventors: Tae Jin Lee, Suwon-si (KR); Chul Wan Park, Suwon-si (KR); Ji Hyoung Ahn, Suwon-si (KR)

(73) Assignee: RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 197 days.

(21) Appl. No.: 14/557,228

(22) Filed: Dec. 1, 2014

(65) Prior Publication Data
US 2015/0154426 A1    Jun. 4, 2015

(30) Foreign Application Priority Data

Dec. 2, 2013 (KR) .......................... 10-2013-0148494

(51) Int. Cl.
*G06K 7/10* (2006.01)

(52) U.S. Cl.
CPC ................................ *G06K 7/10069* (2013.01)

(58) Field of Classification Search
CPC ...... G06Q 30/02; G06Q 30/00; G06Q 10/087; G06Q 10/02; G06Q 10/20; G06Q 30/0645; G06Q 10/10

USPC ......................................................... 340/10.1
See application file for complete search history.

(56) References Cited

U.S. PATENT DOCUMENTS

| | | | |
|---|---|---|---|
| 8,595,058 B2* | 11/2013 | Fordyce, III | G06Q 20/10 705/14.1 |
| 8,639,567 B2* | 1/2014 | Winters | G06Q 30/0255 705/14.1 |
| 8,813,188 B2* | 8/2014 | Vauclair | H04L 41/28 726/3 |
| 8,838,982 B2* | 9/2014 | Carlson | H04L 9/3247 713/176 |

FOREIGN PATENT DOCUMENTS

| | | |
|---|---|---|
| KR | 10-2009-0051477 A | 5/2009 |
| KR | 10-0964966 B1 | 6/2010 |
| KR | 10-1164620 B1 | 7/2012 |

OTHER PUBLICATIONS

Korean Office Action issued Jun. 17, 2014 in counterpart Korean Application No. KR 10-2013-0148494 (4 pages, in Korean).

\* cited by examiner

*Primary Examiner* — Mark Blouin
(74) *Attorney, Agent, or Firm* — NSIP Law

(57) ABSTRACT

A method for recognizing a tag in an environment where the same frequency band is in use and an NFC device for the same are provided. Depending on whether a radio channel is in use, the NFC device changes a first operation mode to a second operation mode, requests slot assignment for tag recognition at the second operation mode, and changes the second operation mode back to the first operation mode to perform a tag recognition process at an assigned slot.

20 Claims, 10 Drawing Sheets

FIG. 4
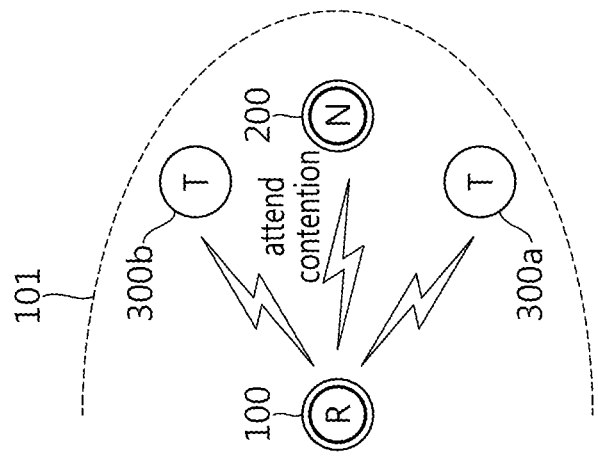
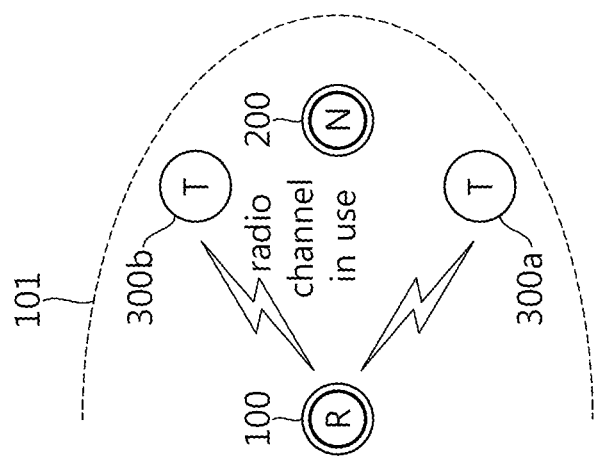

FIG. 5
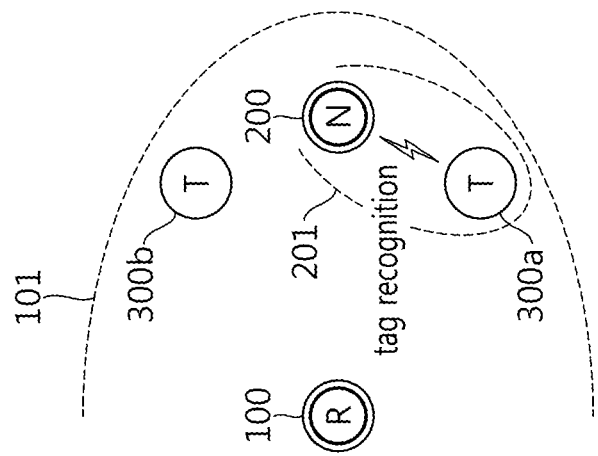
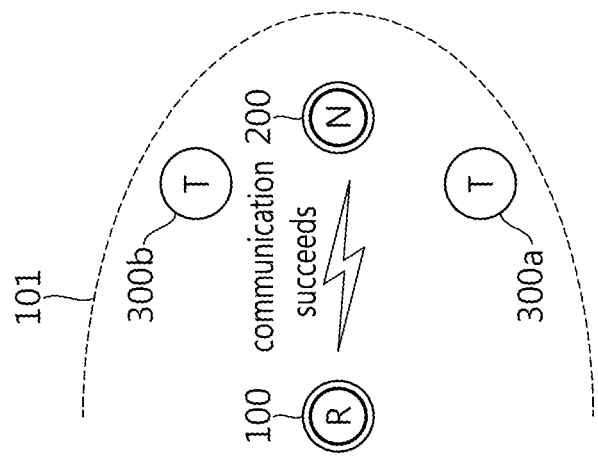

FIG. 10

METHOD FOR RECOGNIZING TAG IN ENVIRONMENT USING SAME FREQUENCY BAND AND NFC DEVICE FOR THE SAME

CROSS-REFERENCE TO RELATED APPLICATIONS

Priority to Korean patent application number 10-2013-0148494 filed on Dec. 2, 2013 the entire disclosure of which is incorporated by reference herein, is claimed.

BACKGROUND OF THE INVENTION

Field of the Invention

The present invention relates to a method for recognizing a tag in an environment using the same frequency band and an NFC (Near Field Communication) device for the same, and more specifically, to a tag recognition method that may reduce a tag recognition delay of an NFC device in an environment in which an RFID (Radio Frequency Identification) device and an NFC device using the same frequency co-exist and an NFC device for the same.

Discussion of the Related Art

Wireless communication technologies are being employed in various industries. In particular, the RFID device has a recognition radius of about 10 m to 15 m and is employed in a diversity of applications including electronic identification, electronic money, credit cards, logistics management, etc. Such RFID device performs transmission and reception of information in a contactless manner.

Growing interest is recently oriented to NFC communication that adopts the same frequency band as the RFID device (13.56 MHz) and that wirelessly transmits and receives data in a shorter range (about 10 cm). Such NFC device has wide applications to mobile terminals, digital cameras, personal computers, or other electronic devices. In particular, the NFC device mounted in smartphones sharply increases its availability.

As such, as the RFID device and the NFC device use the same frequency band (e.g., 13.56 MHz), the two devices may collide with each other when recognizing of the same tag at the same time in the environment in which the RFID device and the NFC device co-exist.

Accordingly, a need exists for a technique for recognizing a tag without collision in the environment where the RFID device and the NFC device are together in use.

PRIOR ART DOCUMENTS

Patent Documents (Patent Document 1) Korean Patent Application Publication No. 10-2009-0051477 ("Interference Control System of multiple RFID readers," ASIANA IDT, published on May 22, 2009)

SUMMARY OF THE INVENTION

To address the above issues, an object of the present invention is to provide a tag recognition method that may reduce a tag recognition delay of an NFC device in an environment in which an RFID device and an NFC device using the same frequency co-exist and an NFC device for the same.

To achieve the above object of the present invention, according to an aspect of the present invention, a method for recognizing a tag by an NFC device includes: changing a first operation mode to a second operation mode depending on whether a radio channel is in use; sending a request for slot assignment for tag recognition at the second operation mode; and changing the second operation mode to the first operation mode to recognize a tag at an assigned slot.

Recognizing the tag at the assigned slot includes: sensing a state of the radio channel at the first operation mode; when the radio channel is in use, changing the first operation mode to the second operation mode; and when the radio channel is not in use, maintaining the first operation mode to perform a tag recognition process within a transmission radius.

Requesting the slot assignment includes: when receiving a wake-up command or a re-enter round command at the second operation mode, selecting a slot in a frame transmitted next to the wake-up command or the re-enter round command; and requesting the slot assignment at the selected slot.

Requesting the slot assignment includes: when receiving the wake-up command, selecting a slot in a frame transmitted next to the wake-up command; and transmitting a precursor message including an identifier of the NFC device and a response message including a slot assignment request message at the slot to request the slot assignment.

Transmitting the precursor message and the response message to request the slot assignment includes: when a counter is the same as a preset value, transmitting the precursor message and the response message within the slot duration; and when the counter is not the same as the preset value, waiting to receive a close-slot command and subtracting from the counter.

Requesting the slot assignment includes: determining whether a next-slot command is received at the slot; when the next-slot command is received, generating a mode change request message including information on the assigned slot; and when the next-slot command is not received, waiting to receive a re-enter round command without attending a contention of the frame.

Recognizing the tag at the assigned slot includes: detecting information on the assigned slot from the mode change request message; changing the second operation mode to the first operation mode; and performing a tag recognition process within a transmission radius during the assigned slot duration at the first operation mode.

Requesting the slot assignment includes: when the re-enter round command is received, selecting a slot in a frame transmitted next to the re-enter round command; and transmitting a precursor message including an identifier of the NFC device and a response message including a slot assignment request message at the slot to request the slot assignment.

The first operation mode is a reader mode, and the second operation mode is a contactless card mode (card emulation mode) for requesting the slot assignment in an environment where the same frequency band is in use.

To achieve the above object of the present invention, according to another aspect of the present invention, an NFC device performing tag recognition includes: a mode management unit changing a first operation mode to a second operation mode for requesting slot assignment according to whether a radio channel is in use, and when the slot assignment is complete, changing the second operation mode to the first operation mode for the tag recognition; and a changed mode execution unit requesting slot assignment for the tag recognition at the second operation mode.

The NFC device further includes a channel recognition unit sensing a state of the radio channel at the first operation mode and transmitting a result of determining whether the radio channel is in use to the mode management unit.

The mode management unit, when the radio channel is in use, may change the first operation mode to the second operation mode, and when the radio channel is not in use, may allow the first operation mode to be maintained.

The changed mode execution unit, when receiving a wake-up command or a re-enter round command at the second operation mode, may select a slot in a frame transmitted next to the wake-up command or the re-enter round command and may request slot assignment at the selected slot.

The changed mode execution unit, when the wake-up command is received, may select a slot in a frame transmitted next to the wake-up command and may transmit a precursor message including an identifier of the NFC device and a response message including a slot assignment request message at the slot to request slot assignment.

The changed mode execution unit, when a counter is the same as a preset value, may transmit the precursor message and the response message within the slot duration, and when the counter is not the same as the preset value, may wait to receive a close-slot command and may subtract from the counter.

The changed mode execution unit may transmits a mode change request message including information on the assigned slot to the mode management unit, or without attending a contention with the frame, may waits to receive the re-enter round command depending on a result of determining whether a next-slot command is received within the slot duration.

The mode management unit, when the mode change request message is received, may change the second operation mode to the first operation mode, and may transmit, to a tag management unit, a result of detecting information on the assigned slot from the mode change request message to request a tag recognition process to be performed.

The tag management unit may perform a tag recognition process within a transmission radius during the assigned slot duration at the first operation mode.

The changed mode execution unit, when the re-enter round command is received, may select a slot in a frame transmitted next to the re-enter round command and may transmit a precursor message including an identifier of the NFC device and a response message including a slot assignment request message at the slot to request slot assignment.

The first operation mode may be a reader mode, and the second operation mode may be a contactless card mode (card emulation mode) for requesting the slot assignment in an environment where the same frequency band is in use.

According to the above-described tag recognition method in the environment in which the same frequency band is in use and NFC device for the same, the NFC device switches its operation mode to a contactless card mode (card emulation mode) depending on whether the RFID device uses a radio channel to be assigned with a slot for tag recognition from the RFID device, so that the NFC device may recognize a tag with no collision at the assigned slot. Accordingly, the delay required for the NFC device to recognize the tag may be reduced.

Further, according to an embodiment of the present invention, standardization of tag recognition protocols may be led by developing scenarios in the co-existent environment of the RFID device and the NFC device.

BRIEF DESCRIPTION OF DRAWINGS

FIGS. 4 and 5 are views schematically illustrating an operation of an NFC device in the environment where the NFC device and an RFID device using the same frequency band co-exist, according to an embodiment of the present invention;

FIG. 10 is a view illustrating an example RFID communication standard as specified in the ISO international standards.

DETAILED DESCRIPTION OF EMBODIMENTS

Various modifications may be made to the present invention and the present invention may have a number of embodiments. Specific embodiments are described in detail with reference to the drawings.

However, the present invention is not limited to specific embodiments, and it should be understood that the present invention includes all modifications, equivalents, or replacements that are included in the spirit and technical scope of the present invention.

The terms "first" and "second" may be used to describe various components, but the components are not limited thereto. These terms are used only to distinguish one component from another. For example, the first component may be also named the second component, and the second component may be similarly named the first component without departing from the scope of the present invention. The term "and/or" includes a combination of a plurality of related items as described herein or any one of the plurality of related items.

When a component is "connected" or "coupled" to another component, the component may be directly connected or coupled to the other component, but it should be understood that other components may be intervene. In contrast, when a component "is directly connected" or "coupled" to another component, no other components intervene.

The terms used herein are given to describe only the specific embodiments but not intended to limit the present invention. A singular term includes a plural term unless otherwise stated obviously. As used herein, the terms "include" or "have" are used to indicate that there are features, numerals, steps, operations, components, parts or combinations thereof as described herein, but do not exclude the presence or possibility of addition of one or more features, numerals, steps, operations, components, parts or components thereof.

Unless defined otherwise, all the terms including technical or scientific terms as used herein have the same meanings as those generally understood by one of ordinary skill in the art. Such terms as generally defined in the dictionary should be interpreted as having meanings consistent with those understood in the context of the related technologies, and should not be construed as having excessively formal or ideal meanings unless clearly defined in the instant application.

Hereinafter, preferred embodiments of the present invention are described in detail with reference to the accompanying drawings. For better understanding of the present invention, the same reference denotations refer to the same elements throughout the drawings, and repetitive description thereof is skipped.

Figure 1:
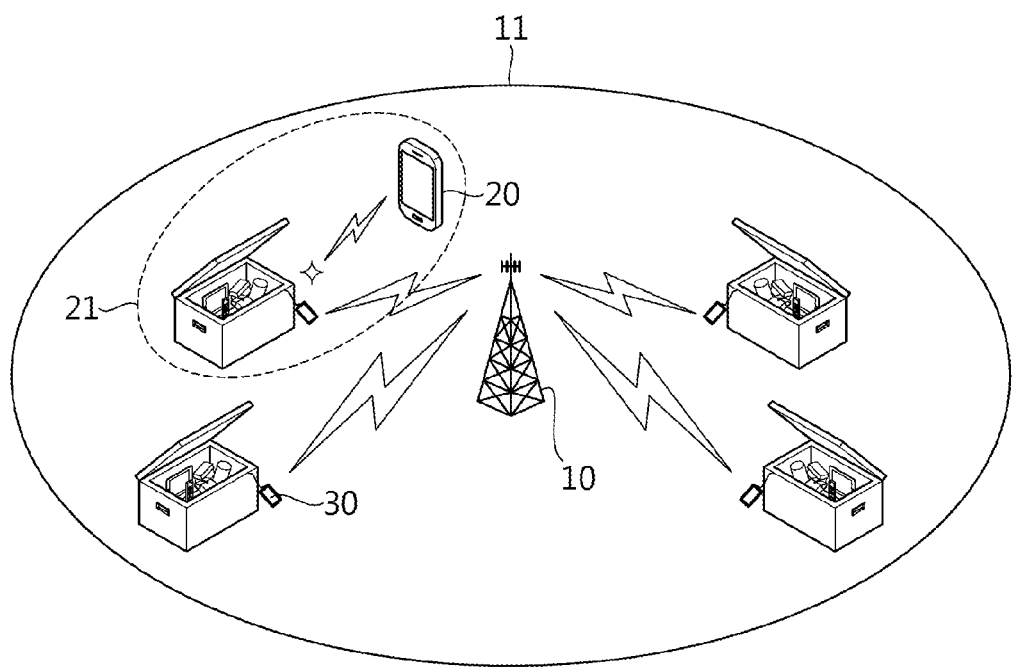
FIG. 1 is a view illustrating an example environment where an RFID device and an NFC device using the same frequency band co-exist according to the prior art.
Figure 2:
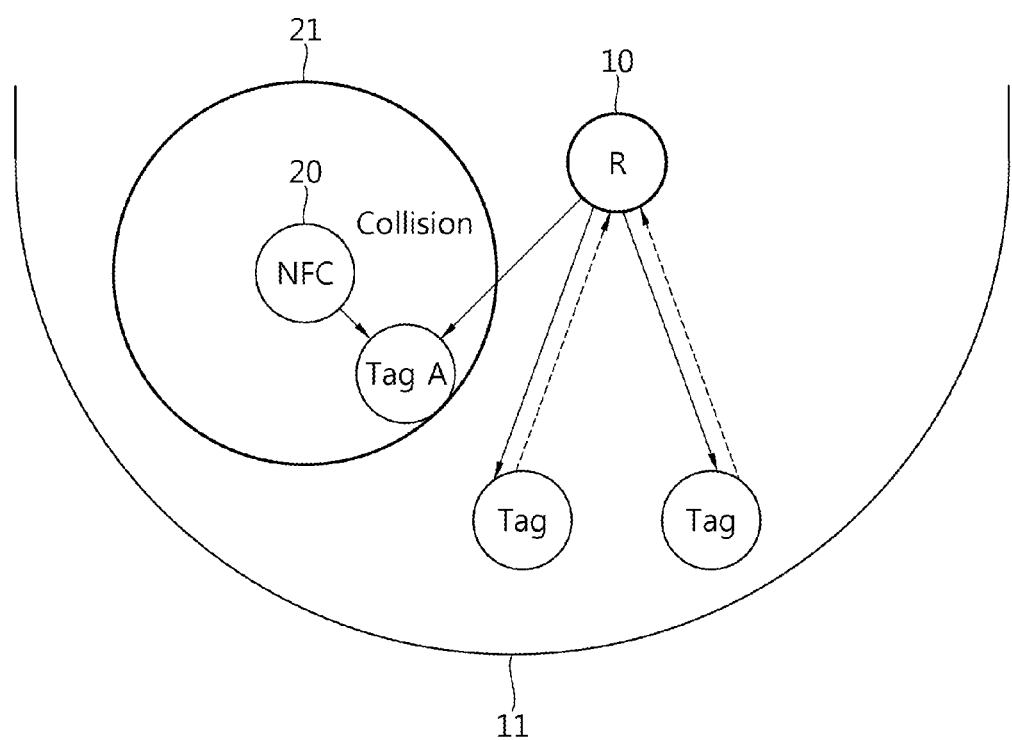
FIG. 2 is a view illustrating an example in which recognition of an NFC device is delayed by an RFID device in the environment where the RFID device and the NFC device using the same frequency band co-exist according to the prior art.
Figure 3:
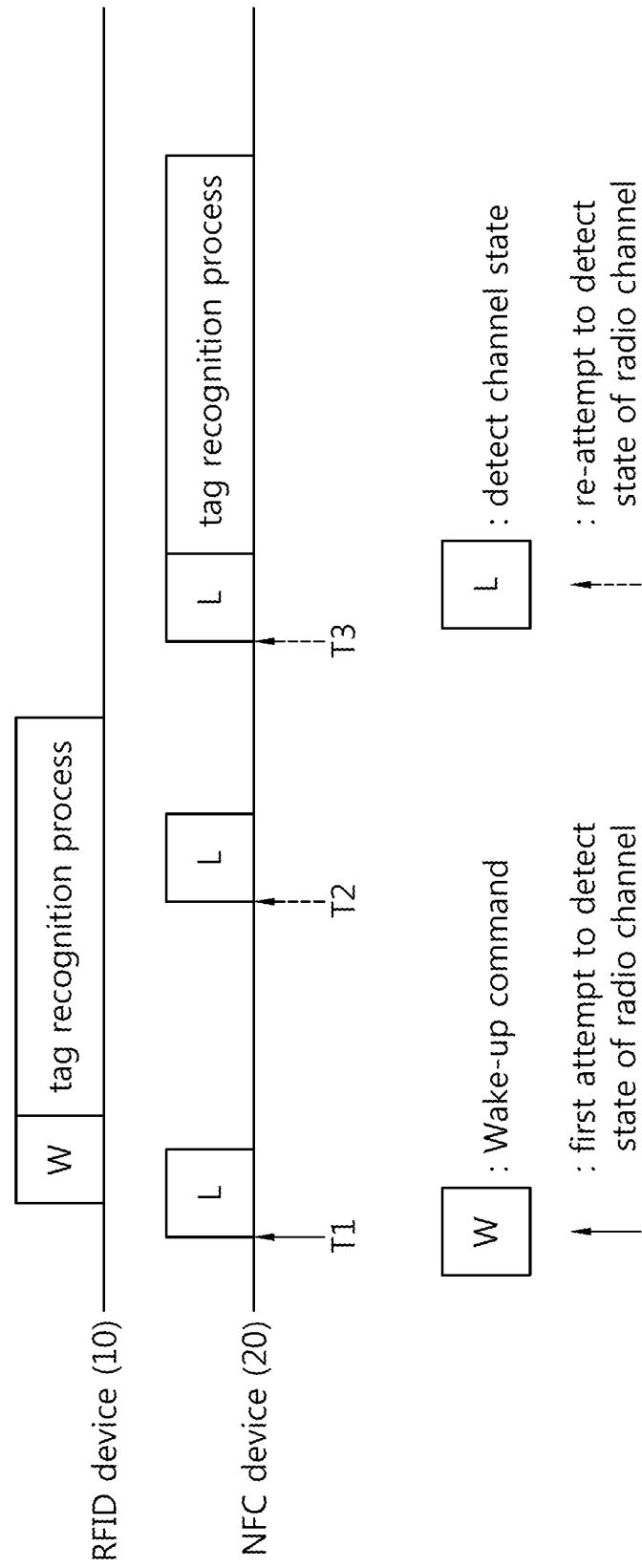
FIG. 3 is a view illustrating a tag recognition process in the environment where the RFID device and the NFC device co-exist as shown in FIG. 2.

FIG. 1 is a view illustrating an example environment where an RFID device and an NFC device using the same frequency band co-exist according to the prior art. FIG. 2 is a view illustrating an example in which recognition of an NFC device is delayed by an RFID device in the environment where the RFID device and the NFC device using the same frequency band co-exist according to the prior art. FIG. 3 is a view illustrating a tag recognition process in the environment where the RFID device and the NFC device co-exist as shown in FIG. 2.

As shown in FIG. 1, a conventional RFID device 10 employs a frequency band of 13.56 MHz and recognizes a tag 30 located in a transmission radius 11 of about 10 m to 15 m to wirelessly transmit and receive data. In this case, if a mobile terminal equipped with the NFC device 20 using a 13.56 MHz frequency band like the conventional RFID device 10 comes within a transmission radius 11 of the RFID device 10, an environment where the RFID device 10 and the NFC device 20 co-exist is formed.

As such, in the environment where the RFID device 10 and the NFC device 20 using the same frequency band co-exist, the transmission radius 21 of the NFC device 20 is very small as compared with the transmission radius 11 of the RFID device 10. Accordingly, the RFID device 10 cannot recognize the presence of the NFC device 20, and thus, collision occurs while the NFC device 20 performs a tag recognition process.

For example, assuming that the NFC device 20 using the same frequency band comes within the transmission radius 11 of the conventional RFID device 10 as shown in FIG. 2, the RFID device 10 cannot recognize the presence of the NFC device 20 having a relatively small transmission radius. As such, under the circumstance where the RFID device 10 does not recognize the presence of the NFC device 20, if the RFID device 10 and the NFC device 20 simultaneously perform a tag recognition process for recognizing a tag (Tag A), a collision occurs.

Specifically, referring to FIGS. 2 and 3, the NFC device 20 that has entered into the transmission radius 11 of the RFID device 10 first senses the state of the radio channel in order to recognize the tag (Tag A)(T1). In case the RFID device 10 is first using the radio channel, the NFC device 20 senses the state of the radio channel after a predetermined time (T2). In case the RFID device 10 is still using the radio channel at the time (T2) when the radio channel has been sensed again, the NFC device 20 senses the state of the radio channel after a predetermined time (T3). If the state of the radio channel shows the radio channel is available (T3), the NFC device 20 performs a tag recognition process for recognizing the tag (Tag A) within the transmission radius 21.

As such, in case the RFID device 10 previously occupies the radio channel in the environment where the RFID device 10 and the NFC device 20 using the same frequency band co-exist, the NFC device 20 cannot use the radio channel and should wait until the use of the radio channel by the RFID device 10 is complete. In other words, in case the RFID device 10 is using the radio channel, the tag recognition process by the NFC device 20 may be delayed.

Hereinafter, a tag recognition method in the environment where the same frequency band is in use and an NFC device for the same according to an embodiment of the present invention to solve the above problems is described in detail. According to an embodiment of the present invention, the RFID device and the NFC device perform a tag recognition process using the FSA (Framed Slotted ALOHA)-based commands specified in the ISO international standards.

FIGS. 4 and 5 are views schematically illustrating an operation of an NFC device in the environment where the NFC device and an RFID device using the same frequency band co-exist, according to an embodiment of the present invention.

As shown in FIGS. 4 and 5, in the environment where a RFID device 100 and an NFC device 200 using the same frequency band co-exist according to an embodiment of the present invention, the NFC device 200 first senses the state of the radio channel to determine whether the RFID device 100 is using the radio channel.

If the RFID device 100 is determined to be using the radio channel, the NFC device 200 switches its operation mode to a contactless card mode (card emulation mode). The NFC device 200 attends the contention together with other tags 300a and 300b according to a query command from the RFID device 100 to attempt to communicate with the RFID device 100. According to an embodiment of the present invention, the NFC device 200 operates in reader mode and contactless card mode (card emulation mode). The reader mode is a mode in which an NFC device may operate as a reader to perform a tag recognition process, and the contactless card mode (card emulation mode) is a mode in which an NFC device may operate like a tag and may attend a contention together with other tags to communicate with an RFID device.

In this case, if the NFC device 200 wins the contention with other tags 300a and 300b, the NFC device 200 transmits data including its identifier to the RFID device 100. The RFID device 100 recognizes through the identifier received from the NFC device 200 that the NFC device 200 is located within the transmission radius 101. The RFID device 100 assigns a slot to allow the NFC device 200 to recognize a tag. Then, the NFC device 200 switches its operation mode to the reader mode during the assigned slot duration to perform a tag recognition process for recognizing a tag 300a within the transmission radius 201.

Figure 6:
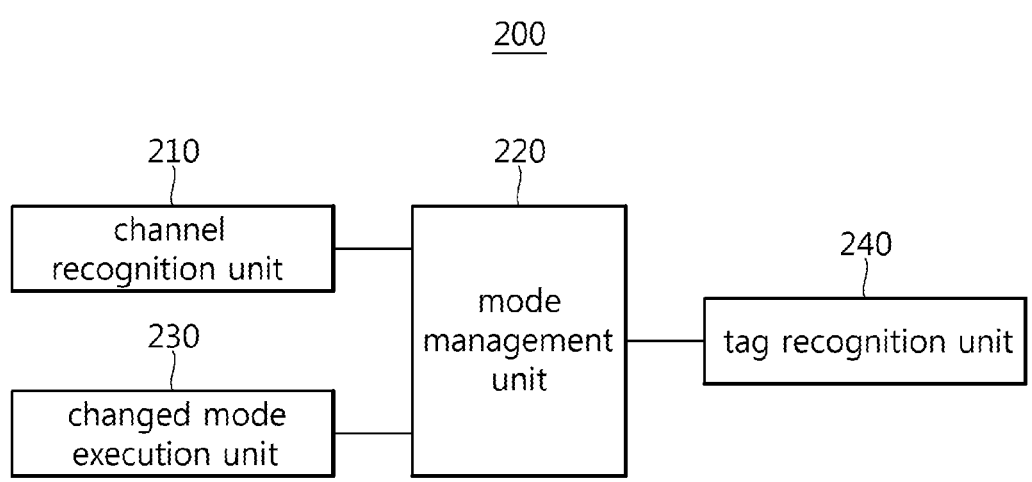
FIG. 6 is a block diagram schematically illustrating an NFC device according to an embodiment of the present invention.
Figure 7:
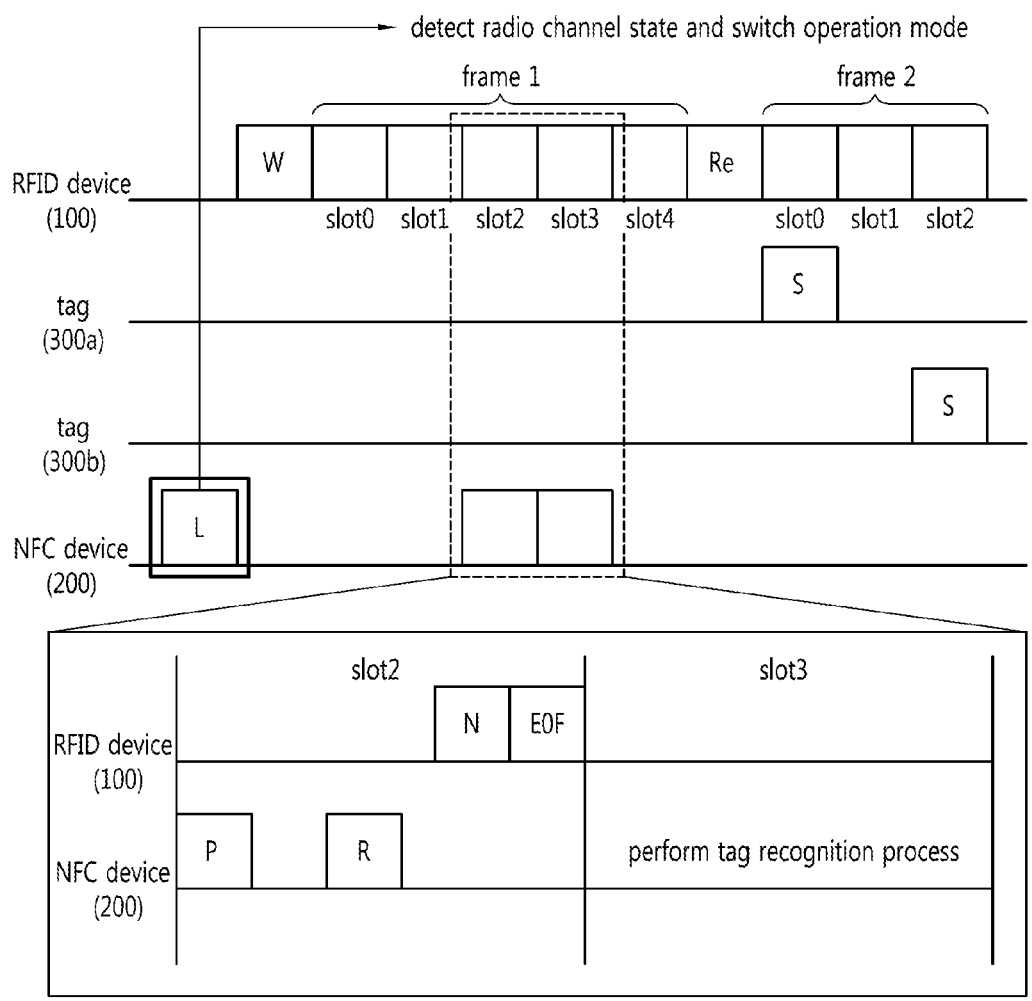
FIG. 7 is a view schematically illustrating an operation of the NFC device shown in FIG. 6.

FIG. 6 is a block diagram schematically illustrating an NFC device according to an embodiment of the present invention. FIG. 7 is a view schematically illustrating an operation of the NFC device shown in FIG. 6.

As shown in FIG. 6, according to an embodiment of the present invention, the NFC device 200 includes a channel recognition unit 210, a mode management unit 220, a changed mode execution unit 230, and a tag recognition unit 240.

The channel recognition unit 210 senses the state of the radio channel to determine whether the RFID device 100 is using the radio channel. If the RFID device 100 is determined to be using the radio channel, the channel recognition unit 210 recognizes the environment where the NFC device co-exists with the RFID device using the same frequency band, generates a channel recognition message to indicate the same, and transmits the channel recognition message to the mode management unit 220. In case the radio channel is not in use, the channel recognition unit 210 informs the mode management unit 220 that in the present circumstance no collision with the RFID device 100 occurs so that the reader mode is maintained.

The mode management unit 220 receives the channel recognition message from the channel recognition unit 210. The mode management unit 220, when the channel recognition message is received, determines that the radio channel is being used and switches the operation mode from the reader mode to contactless card mode (card emulation mode) in order to attempt to communicate with the RFID device 100. And, the mode management unit 220 generates a mode change informing message to indicate that the operation mode has changed and transmits the mode change informing message to the changed mode execution unit 230.

Meanwhile, if the operation in the contactless card mode (card emulation mode) is complete and a mode change request message is transmitted from the changed mode execution unit 230, the mode management unit 220 determines that the communication with the RFID device 100 succeeds. The mode management unit 220 switches the operation mode from the contactless card mode (card emulation mode) back to the reader mode. And, the mode management unit 220 detects information on the assigned slot from the mode change request message. The mode management unit 220 generates a tag recognition request message including the information on the assigned slot in order to inform that the operation mode has switched back to the reader mode and that the slot has been assigned from the RFID device 100 and transmits the tag recognition request message to the tag recognition unit 240.

The changed mode execution unit 230 receives the mode change informing message from the mode management unit 220. The changed mode execution unit 230 operates in the contactless card mode (card emulation mode) to attempt to communicate with the RFID device 100. The changed mode execution unit 230 determines whether a wake-up command W or a re-enter round command Re has been received from the RFID device 100, and as a result, attends the contention together with other tags 300*a* and 300*b* to be assigned with a slot for recognizing a tag.

Specifically, referring to FIG. 7, if the wake-up command W is transmitted from the RHD device 100, the changed mode execution unit 230 detects an availability of the slots slot0 to slot4 of the frame frame1 from the wake-up command W. At this time, the slots slot0 to slot4 are assumed to be all available. The changed mode execution unit 230 selects a desired slot (hereinafter, "selected slot") among the available slots slot0 to slot4. Here, it is assumed that a counter is set to the same value as the slot number. In other words, in the case of slot2, the counter is assumed to be set to "2," the same value as the slot number "2."

The changed mode execution unit 230 determines whether the counter is the same as a preset value (hereinafter, "set value") within the slot slot0 duration. Here, the set value is assumed to be set to "0." The changed mode execution unit 230, unless the counter is equal to the set value, waits until a close-slot command EOF is received. The changed mode execution unit 230, when receiving the close-slot command EOF, subtracts "1" from the counter "2" to set the counter to "1." And, the changed mode execution unit 230 determines whether the counter is equal to the set value within a next slot slot1. The changed mode execution unit 230, unless the counter is equal to the set value, waits until a close-slot command EOF is received. The changed mode execution unit 230, when receiving the close-slot command EOF, subtracts "1" from the counter "1" to set the counter to "0." In the same manner, the changed mode execution unit 230 determines whether the counter is equal to the set value within a next slot slot2. At this time, the slot counter is equal to the set value ("0"), so the changed mode execution unit 230 recognizes the selected slot is started and transmits, to the RFID device 100, a precursor message P including an identifier of the NFC device 200 and a response message R including a slot assignment request message within the slot slot2 duration.

The changed mode execution unit 230 informs that the response message R has been successfully transmitted and receives a next-slot command N including the information on the assigned slot from the RFID device 100. At this time, it is assumed that the slot slot3 has been assigned for the tag recognition process. The changed mode execution unit 230 generates a mode change request message including the information on the assigned slot for tag recognition and transmits the mode change request message to the mode management unit 220.

Meanwhile, the changed mode execution unit 230, when not receiving the next-slot command N from the RFID device 100, waits to receive the re-enter round command Re instead of attending the contention of the current frame. If the re-enter round command Re is transmitted from the RFID device 100, the changed mode execution unit 230 detects an available slot among the slots (slot0 to slot2) of the frame frame2 using the re-enter round command Re and performs the above-described process similar to when the wake-up command W is transmitted, to be thereby assigned with a slot by the RFID device 100.

Turning back to FIG. 6, the tag recognition unit 240 receives the tag recognition request message from the mode management unit 220. The tag recognition unit 240 detects the information on the assigned slot using the tag recognition request message and performs a tag recognition process within the transmission radius 201 at the corresponding slot.

Figure 8:
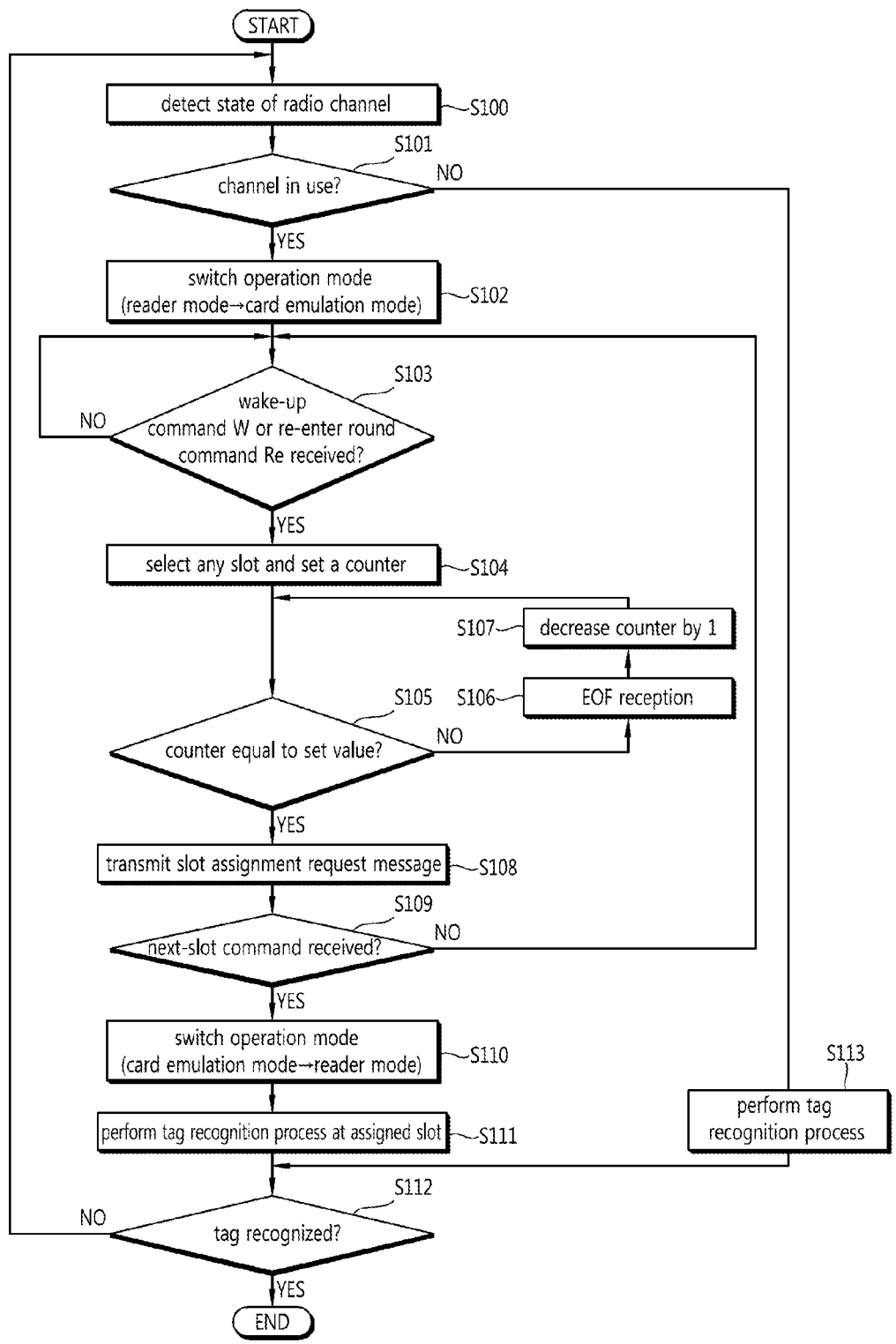
FIG. 8 is a flowchart illustrating a method for recognizing a tag in the environment where an RFID device and a NFC device using the same frequency band co-exist, according to an embodiment of the present invention.

FIG. 8 is a flowchart illustrating a method for recognizing a tag in the environment where an RFID device and a NFC device using the same frequency band co-exist, according to an embodiment of the present invention. It is assumed in FIG. 8 that the NFC device is at reader mode when entering into the transmission radius of the RFID device.

As shown in FIG. 8, according to an embodiment of the present invention, the channel recognition unit 210 of the NFC device 200 senses the state of the radio channel (S100) to determine whether the RFID device 100 is using the radio channel (S101).

If it is determined in step S101 that the RFID device 100 is using the radio channel, the channel recognition unit 210 recognizes the environment where the NFC device co-exists with the RFID device 100 using the same frequency band, generates a channel recognition message to indicate the same, and transmits the channel recognition message to the mode management unit 220.

The mode management unit 220 receives the channel recognition message from the channel recognition unit 210. The mode management unit 220, when the channel recognition message is received, determines that the radio channel is being used and switches the operation mode from the reader mode to contactless card mode (card emulation mode) in order to attempt to communicate with the RFID device 100 (S102). The mode management unit 220 generates a mode change informing message to indicate that the operation mode has changed and transmits the mode change informing message to the changed mode execution unit 230.

The changed mode execution unit 230 receives the mode change informing message from the mode management unit 220. The changed mode execution unit 230 operates in the contactless card mode (card emulation mode) to attempt to communicate with the RFID device 100. The changed mode execution unit 230 determines whether a wake-up command W or Re-enter round command Re has been received (S103).

In case it is determined in step S103 that the wake-up command W or re-enter round command Re is received, the changed mode execution unit 230 selects any available slot (hereinafter, "selected slot") among the slots of the frame and set the counter using the wake-up command W or the re-enter round command Re (S104). According to an embodiment of the present invention, it is assumed that the wake-up command W has been transmitted earlier than the re-enter round command Re. The changed mode execution unit 230 determines whether the counter from the RFID device 100 is the same as a set value (S105).

If it is determined in step S105 that the counter is not the same as the set value, the changed mode execution unit 230 waits until a close-slot command EOF is received (S106). If the close-slot command EOF is received, the changed mode execution unit 230 subtracts "1" from the counter (S107) and goes back to step S105 and stands by. In case it is determined in step S105 that the counter is the same as the set value, the changed mode execution unit 230 generates a response message R including a slot assignment request message and a precursor message P including an identifier of the NFC device 200 within the selected slot duration and transmits the messages to the RFID device 100 (S108). After transmitting the response message R, the changed mode execution unit 230 determines whether a next-slot command N including the information on the assigned slot is received (S109).

In case it is determined in step S109 that the next-slot command N is received, the changed mode execution unit 230 generates a mode change request message including the information on the assigned slot and transmits the mode change request message to the mode management unit 220. In case it is determined in step S109 that the next-slot command N is not received, the changed mode execution unit 230, instead of attending the contention of the current frame, returns to step S103 to wait to receive the re-enter round command Re and conducts step S103 and its subsequent steps.

The mode management unit 220 receives the mode change request message from the changed mode execution unit 230. If the mode change request message is transmitted, the mode management unit 220 determines that the communication with the RFID device 100 succeeds and switches the operation mode from the contactless card mode (card emulation mode) back to the reader mode (S110). The mode management unit 220 generates a tag recognition request message including the information on the assigned slot in order to inform that the operation mode has switched back to the reader mode and that the slot has been assigned from the RFID device 100 and transmits the tag recognition request message to the tag recognition unit 240.

The tag recognition unit 240 detects the information on the assigned slot using the tag recognition performing request message and performs a tag recognition process within the transmission radius 201 at the corresponding slot (S111). The tag recognition unit 240 determines whether a tag has been recognized (S112). In case it is determined in step S112 that no tag is recognized, the NFC device 200 returns to step S100 and repeats the same process.

Meanwhile, in case it is determined in step S101 that the RFID device 100 is not using the radio channel, the channel recognition unit 210 informs the mode management unit 220 that in the instant circumstance no collision with the RFID device 100 occurs to thus allow a tag to be recognized within a transmission radius at reader mode (S113), and performs step S112 and its subsequent steps.

Figure 9:
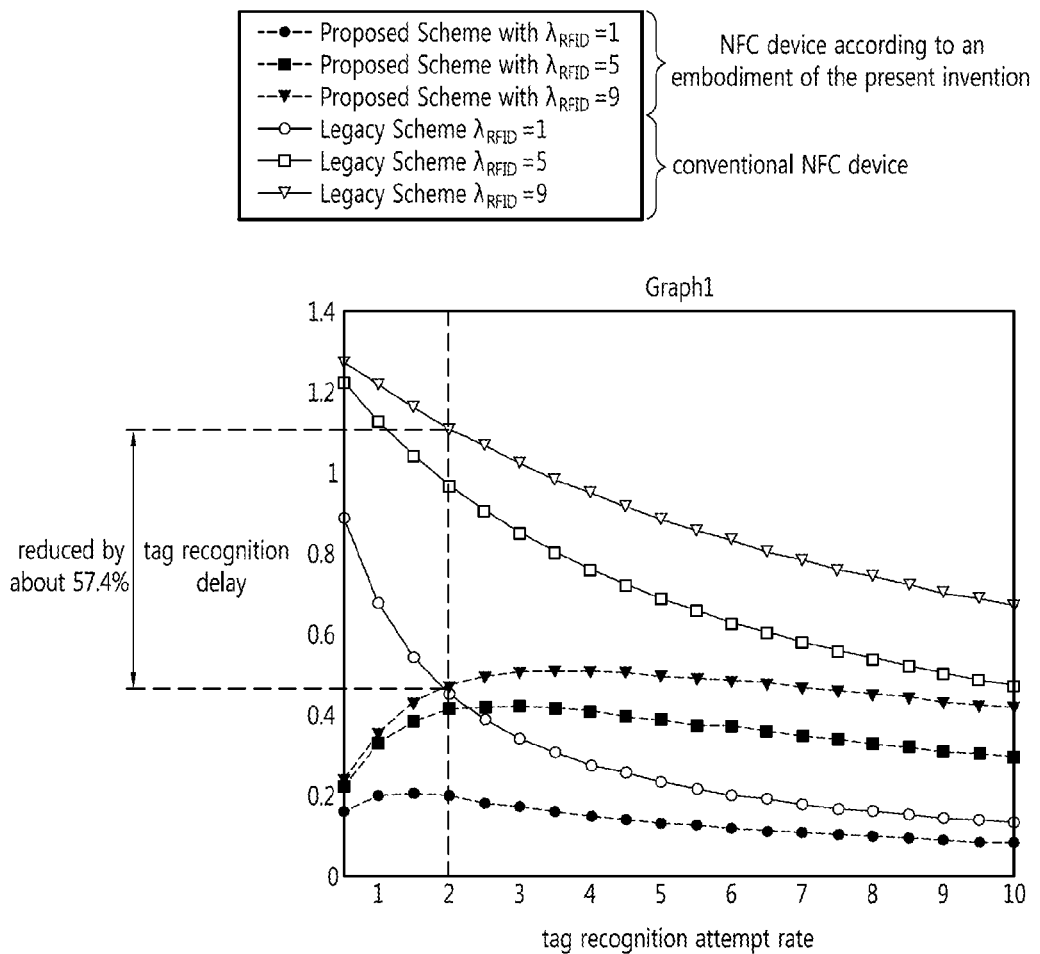
FIG. 9 illustrates a result of simulation on a tag recognition delay of an NFC device according to an embodiment of the present invention.
Figure 10:
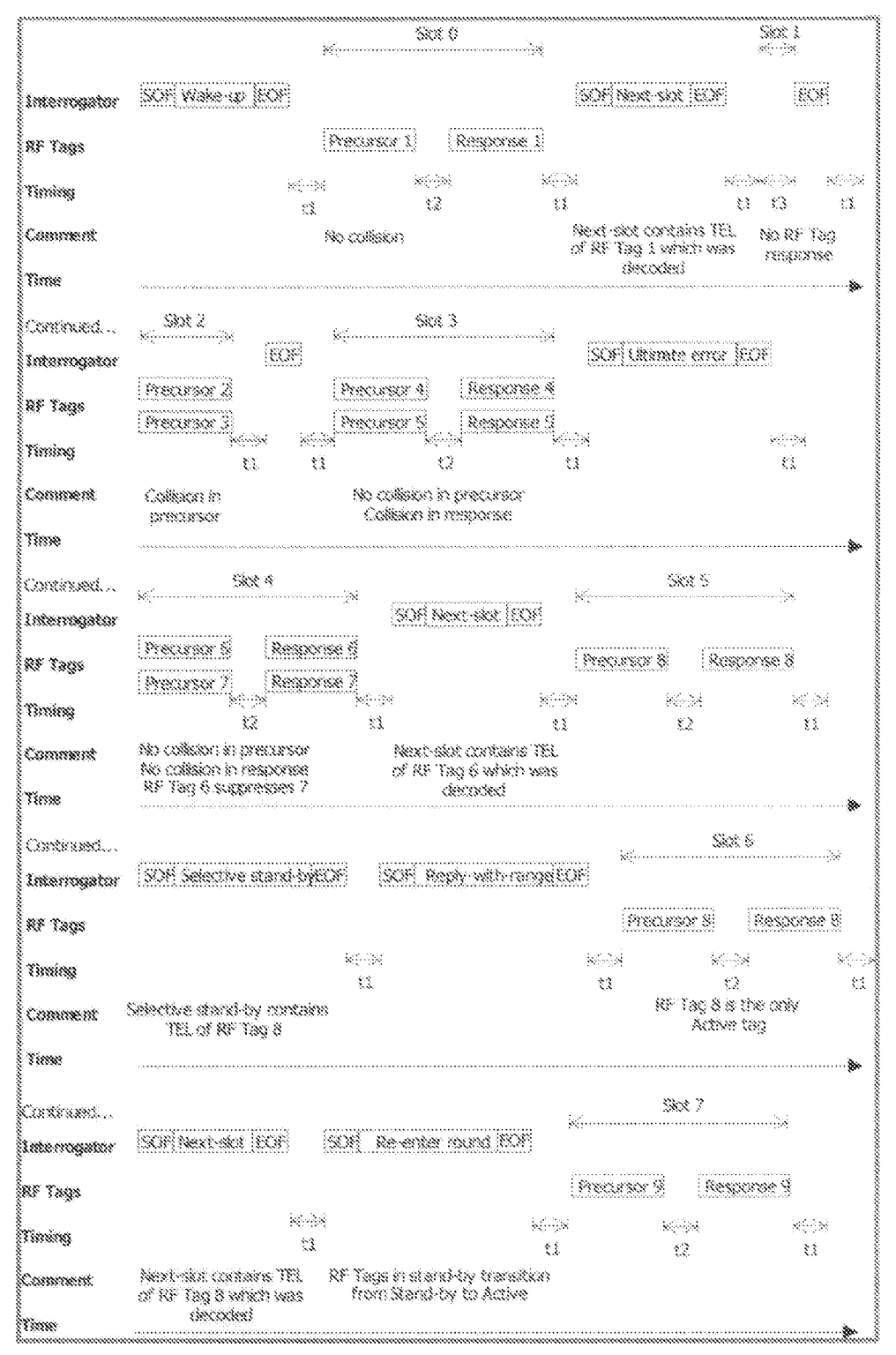

FIG. 9 illustrates a result of simulation on a tag recognition delay of an NFC device according to an embodiment of the present invention. FIG. 10 is a view illustrating an RFID communication standard as specified in the ISO international standards.

As shown in FIG. 9, in the simulation method according to an embodiment of the present invention, the delays of the NFC device 200 are simulated while increasing an arrival time (hereinafter, "tag recognition attempt rate") at which the NFC device 200 attempts channel detection to recognize a tag in the environment where the RFID device 100 and the NFC device 200 using the same frequency band co-exist.

The simulation result Graph1 shows that when the RFID device 100 and the NFC device 200 perform tag recognition, as the tag recognition attempt rate (arrival rate) of the NFC device 200 increases while the tag recognition attempt rate (arrival rate) of the RFID device 100 decreases, the tag recognition delay of the NFC device 200 is decreased. For example, it may be verified that in case the tag recognition attempt rate (arrival rate) of the NFC device 200 is "2" while the tag recognition attempt rate (arrival rate) of the RFID device 100 is fixed to "9," the tag recognition delay of the NFC device 200 is reduced by about 57.4% as compared with the conventional environment where the RFID device and the NFC device using the same frequency band co-exist.

As such, as the operation mode of the NFC device switches to contactless card mode (card emulation mode) depending on whether the RFID device is using the radio channel in the environment where the RFID device and the NFC device using the same frequency band co-exist, to be thereby assigned with a slot for tag recognition, according to an embodiment of the present invention, tag recognition may be possible without collision at the slot assigned by the RFID device even without changing the RFID communication standards shown in FIG. 10, thus reducing the tag recognition delay of the NFC device.

Hereinbefore, the preferred embodiments of the present invention are described with reference to the accompanying drawings but not intended to limit the scope of the present invention, and it may be understood by one of ordinary skill in the art that various changes in form and detail may be made thereto without departing from the idea and scope of the present invention defined in the following claims.

What is claimed is:

1. A method for recognizing a tag by an NFC device, the method comprising:
    sensing a state of the radio channel at the first operation mode;
    changing a first operation mode to a second operation mode depending on the sensed state of the radio channel;
    sending a request for slot assignment for tag recognition at the second operation mode; and
    changing the second operation mode to the first operation mode to recognize a tag at an assigned slot.

2. The method of claim 1, wherein recognizing the tag at the assigned slot further comprises:

changing, when the radio channel is in use, the first operation mode to the second operation mode; and when the radio channel is not in use, maintaining the first operation mode to perform a tag recognition process within a transmission radius.

3. The method of claim 1, wherein the request for slot assignment comprises:

when receiving a wake-up command or a re-enter round command at the second operation mode, selecting a slot in a frame transmitted next to the wake-up command or the re-enter round command; and requesting the slot assignment at the selected slot.

4. The method of claim 3, wherein the request for slot assignment further comprises:

when receiving the wake-up command, selecting a slot in a frame transmitted next to the wake-up command; and transmitting a precursor message including an identifier of the NFC device and a response message including a slot assignment request message at the slot to request the slot assignment.

5. The method of claim 4, wherein transmitting the precursor message and the response message to request the slot assignment comprises:

when a counter is the same as a preset value, transmitting the precursor message and the response message within the slot duration; and when the counter is not the same as the preset value, waiting to receive a close-slot command and subtracting from the counter.

6. The method of claim 4, wherein the request for slot assignment further comprises:

determining whether a next-slot command is received at the slot;

when the next-slot command is received, generating a mode change request message including information on the assigned slot; and when the next-slot command is not received, waiting to receive a re-enter round command without attending a contention of the frame.

7. The method of claim 6, wherein recognizing the tag at the assigned slot comprises:

detecting information on the assigned slot from the mode change request message;

changing the second operation mode to the first operation mode; and performing a tag recognition process within a transmission radius during the assigned slot duration at the first operation mode.

8. The method of claim 6, wherein the request for slot assignment comprises:

when the re-enter round command is received, selecting a slot in a frame transmitted next to the re-enter round command; and transmitting a precursor message including an identifier of the NFC device and a response message including a slot assignment request message at the slot to request the slot assignment.

9. The method of claim 1, wherein the first operation mode is a reader mode, and the second operation mode is a contactless card mode (card emulation mode) for requesting the slot assignment in an environment where the same frequency band is in use.

10. An NFC device performing tag recognition, the NFC device comprising:

a channel recognition unit configured to sense a state of the radio channel at the first operation mode;

a mode management unit configured to change a first operation mode to a second operation mode for requesting slot assignment according to a determination by the channel recognition unit of whether a radio channel is in use, and when the slot assignment is complete, change the second operation mode to the first operation mode for the tag recognition; and a changed mode execution unit configured to request slot assignment for the tag recognition at the second operation mode.

11. The NFC device of claim 10, further comprising a channel recognition unit further configured to transmit a result of determining whether the radio channel is in use to the mode management unit.

12. The NFC device of claim 11, wherein the mode management unit is further configured to change, when the radio channel is in use, the first operation mode to the second operation mode, and allow, when the radio channel is not in use, the first operation mode to be maintained.

13. The NFC device of claim 10, wherein the changed mode execution unit is further configured to select, when receiving a wake-up command or a re-enter round command at the second operation mode, a slot in a frame transmitted next to the wake-up command or the re-enter round command and request slot assignment at the selected slot.

14. The NFC device of claim 13, wherein the changed mode execution unit is further configured to select, when the wake-up command is received, a slot in a frame transmitted next to the wake-up command and transmit a precursor message including an identifier of the NFC device and a response message including a slot assignment request message at the slot to request slot assignment.

15. The NFC device of claim 14, wherein the changed mode execution unit is further configured to transmit, when a counter is the same as a preset value, the precursor message and the response message within the slot duration, and wait, when the counter is not the same as the preset value, to receive a close-slot command and subtracts from the counter.

16. The NFC device of claim 15, wherein the changed mode execution unit is further configured to transmit a mode change request message including information on the assigned slot to the mode management unit, or without attending a contention with the frame, wait to receive the re-enter round command depending on a result of determining whether a next-slot command is received within the slot duration.

17. The NFC device of claim 16, wherein the mode management unit is further configured to change, when the mode change request message is received, the second operation mode to the first operation mode, and transmit, to a tag management unit, a result of detecting information on the assigned slot from the mode change request message to request a tag recognition process to be performed.

18. The NFC device of claim 17, wherein the tag management unit is configured to perform a tag recognition process within a transmission radius during the assigned slot duration at the first operation mode.

19. The NFC device of claim 13, wherein the changed mode execution unit is further configured to select, when the re-enter round command is received, a slot in a frame transmitted next to the re-enter round command and transmit a precursor message including an identifier of the NFC device and a response message including a slot assignment request message at the slot to request slot assignment.

20. The NFC device of claim 10, wherein the first operation mode is a reader mode, and the second operation mode is a contactless card mode (card emulation mode) for requesting the slot assignment in an environment where the same frequency band is in use.

\* \* \* \* \*